United States Patent
Oguma et al.

(10) Patent No.: US 9,591,150 B2
(45) Date of Patent: Mar. 7, 2017

(54) PULL PRINTING SYSTEM THAT REDUCES COMMUNICATION TRAFFIC VOLUME RELATIVE TO SERVER COMPUTER AND MANAGEMENT BURDEN OF DEVICE

(71) Applicant: Kyocera Document Solutions Inc., Osaka (JP)

(72) Inventors: Takashi Oguma, Osaka (JP); Masafumi Sato, Osaka (JP); Zhenyu Sun, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/935,435

(22) Filed: Nov. 8, 2015

(65) Prior Publication Data

US 2016/0134764 A1    May 12, 2016

(30) Foreign Application Priority Data

Nov. 8, 2014 (JP) ................................. 2014-227620

(51) Int. Cl.
| | |
|---|---|
| *H04N 1/00* | (2006.01) |
| *H04N 1/44* | (2006.01) |
| *G06F 3/12* | (2006.01) |
| *H04N 1/32* | (2006.01) |

(52) U.S. Cl.
CPC ......... *H04N 1/0023* (2013.01); *G06F 3/1222* (2013.01); *G06F 3/1224* (2013.01); *G06F 3/1238* (2013.01); *G06F 3/1239* (2013.01); *G06F 3/1286* (2013.01); *G06F 3/1287* (2013.01); *G06F 3/1288* (2013.01); *H04N 1/00244* (2013.01); *H04N 1/32523* (2013.01); *H04N 1/4413* (2013.01); *H04N 2201/0094* (2013.01); *H04N 2201/3278* (2013.01)

(58) Field of Classification Search
None
See application file for complete search history.

(56) References Cited

U.S. PATENT DOCUMENTS

| | | |
|---|---|---|
| 2003/0167336 A1 | 9/2003 | Iwamoto et al. |
| 2008/0094657 A1* | 4/2008 | Ikegami ................ G06F 21/608 358/1.15 |

(Continued)

FOREIGN PATENT DOCUMENTS

| | | |
|---|---|---|
| JP | 2007158867 A * | 6/2007 |
| JP | 2014-081728 | 5/2014 |

(Continued)

*Primary Examiner* — Thomas D Lee
(74) *Attorney, Agent, or Firm* — James Judge

(57) ABSTRACT

A pull printing system according to one aspect of the disclosure includes a server computer, a manager image forming apparatus, and a client image forming apparatus. The manager image forming apparatus includes a manager-side print execution unit that executes a print job received to a first port number, a job management unit that manages the print job received to a second port number different from the first port number in association with the user, and a job transmitting unit. The job transmitting unit transmits the print job associated with a user authenticated by the server computer to the client image forming apparatus among the print job managed by the job management unit.

3 Claims, 20 Drawing Sheets

(56) References Cited

U.S. PATENT DOCUMENTS

2009/0279117 A1* 11/2009 Kondo .................... B41J 29/38
358/1.14
2010/0097632 A1 4/2010 Hattori

FOREIGN PATENT DOCUMENTS

| JP | 2014-156087 A | 8/2014 |
| JP | 2014-159123 A | 9/2014 |
| JP | 2014-179027 A | 9/2014 |

* cited by examiner

FIG. 6

| Job Name | Login User Name | Date and Time | Size [MB] | Duplex Printing Setting | Number of Pages | Color Mode | ... |
|---|---|---|---|---|---|---|---|
| Word_140513_102723.prn | k080701267 | 09:08, May 13, 2014 | 0.3 | Applicable | 9 Pages | Color | ... |
| . . . | . . . | . . . | . . . | . . . | . . . | . . . | . . . |

48g

PULL PRINTING SYSTEM THAT REDUCES COMMUNICATION TRAFFIC VOLUME RELATIVE TO SERVER COMPUTER AND MANAGEMENT BURDEN OF DEVICE

INCORPORATION BY REFERENCE

This application is based upon, and claims the benefit of priority from, corresponding Japanese Patent Application No. 2014-227620 filed in the Japan Patent Office on Nov. 8, 2014, the entire contents of which are incorporated herein by reference.

BACKGROUND

Unless otherwise indicated herein, the description in this section is not prior art to the claims in this application and is not admitted to be prior art by inclusion in this section.

As a pull printing system that ensures pull printing, there is known a following system. The system transmits a print job to a server computer from a computer of a user so as to causes the server computer to store the print job, and the user logins to any image forming apparatus. Then, the print job of the user is transmitted to this image forming apparatus from the server computer, and the image forming apparatus executes the transmitted print job.

SUMMARY

A pull printing system according to one aspect of the disclosure includes a server computer, a manager image forming apparatus, and a client image forming apparatus. The server computer executes authentication of a user based on authentication information of the user. The manager image forming apparatus includes a manager-side print execution unit that executes a print job received to a first port number and a job management unit that manages the print job received to a second port number different from the first port number in association with the user. The client image forming apparatus includes a client side print execution unit that executes the received print job. The client image forming apparatus includes an authentication information accepting unit and an authentication information transmitting unit. The authentication information accepting unit accepts the authentication information. The authentication information transmitting unit transmits the authentication information accepted by the authentication information accepting unit to the manager image forming apparatus. The manager image forming apparatus includes an authentication information transferring unit and a job transmitting unit. The authentication information transferring unit transfers the authentication information transmitted from the authentication information transmitting unit to the server computer. The job transmitting unit transmits the print job to the client image forming apparatus, the print job being associated with the user authenticated by the server computer based on the authentication information transferred to the server computer by the authentication information transferring unit, among the print job managed by the job management unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 6 illustrates an exemplary job information table according to the one embodiment.

DETAILED DESCRIPTION

Figure 1:
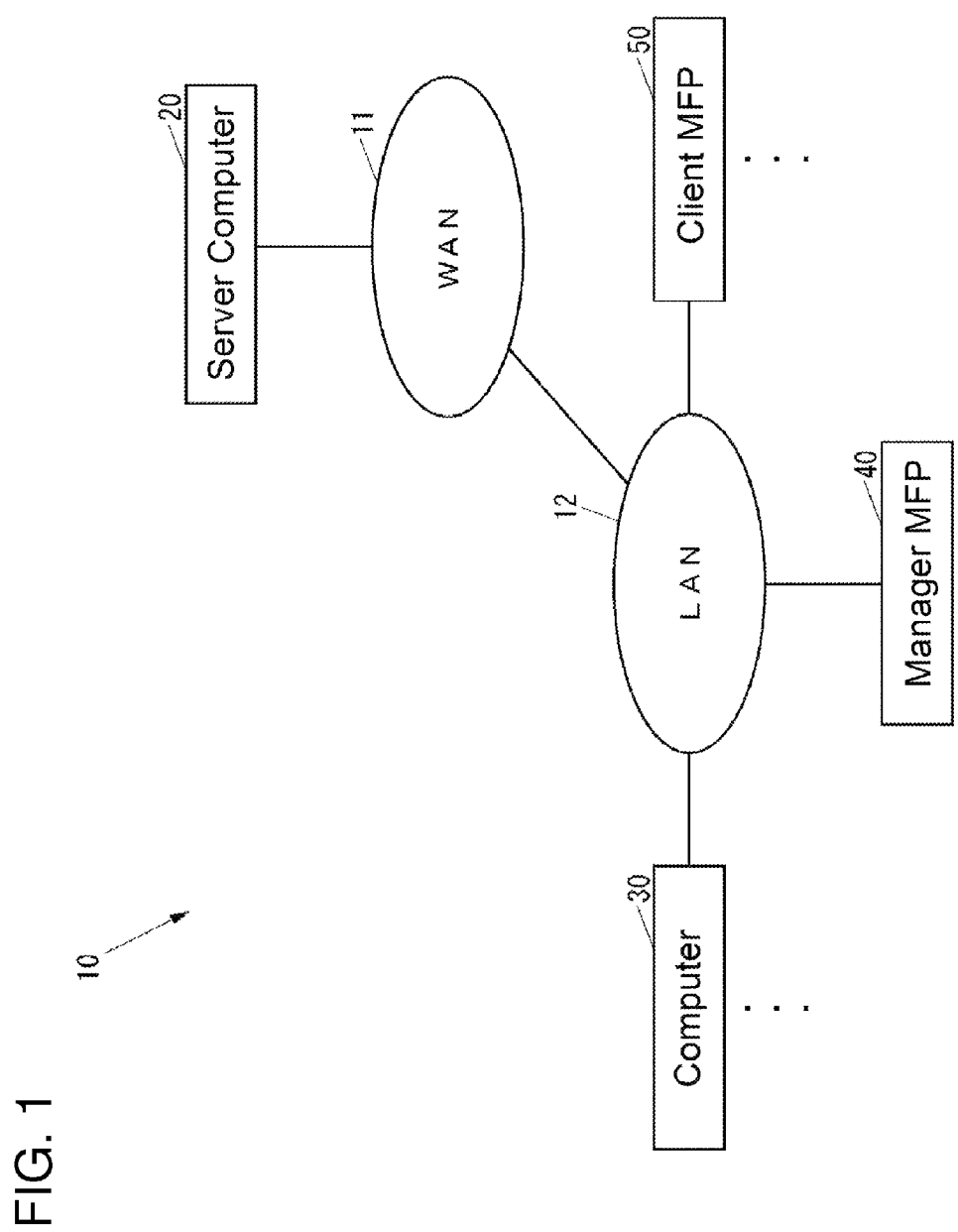
FIG. 1 illustrates a pull printing system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with use of the drawings.

First, a configuration of a pull printing system according to the embodiment will be described.

FIG. 1 illustrates a pull printing system 10 according to the embodiment.

As illustrated in FIG. 1, the pull printing system 10 includes a server computer 20, a computer 30, a manager MFP 40, and a client MFP 50. The server computer 20 executes authentication of a user based on authentication information of the user. The computer 30 transmits a print job. The manager MFP 40 is a multifunction peripheral (MFP) ensuring management of the print job transmitted by the computer 30. The client MFP 50 is a MFP executing a print job managed by the manager MFP 40.

The server computer 20 is connected with a plurality of local area networks (LANs) 12 via a wide area network (WAN) 11.

At least one computer 30 is connected to each of the plurality of LANs 12. One manager MFP 40 is connected to each of the plurality of LANs 12. At least one client MFP 50 is connected to each of the plurality of LANs 12.

The computer 30, the manager MFP 40, and the client MFP 50, which are connected to the identical LAN 12, can communicate with one another.

The server computer 20 and the manager MFP 40 can communicate with one another via the WAN 11 and LAN 12. Similarly, the server computer 20 and the client MFP 50 can communicate with one another via the WAN 11 and LAN 12.

Figure 2:
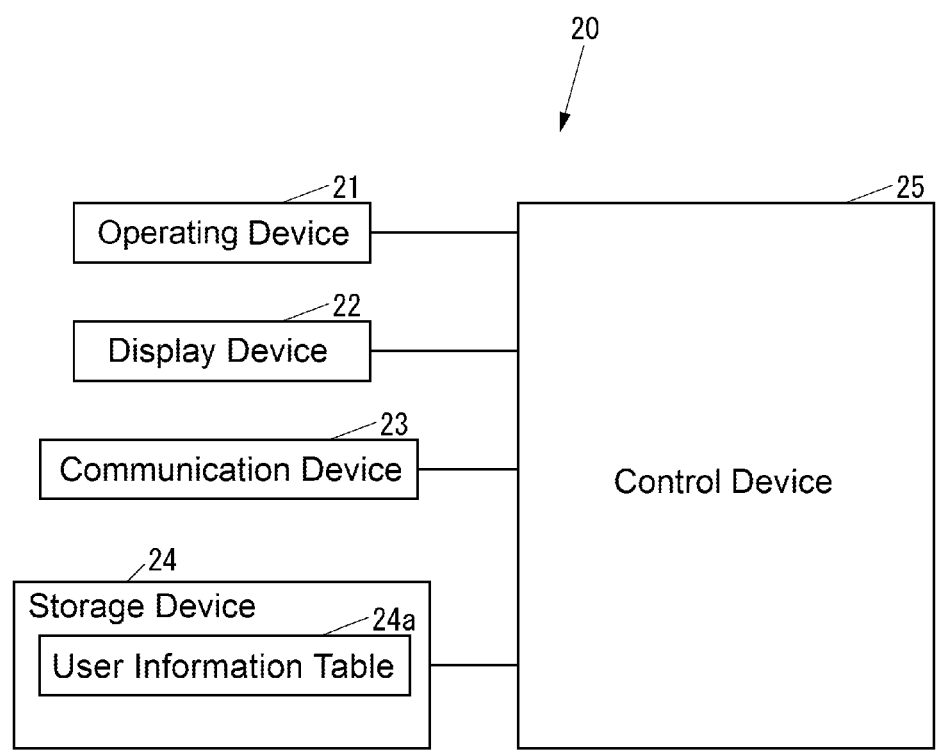
FIG. 2 illustrates a server computer according to the one embodiment.

FIG. 2 illustrates the server computer 20.

As illustrated in FIG. 2, the server computer 20 includes an operating device 21, a display device 22, a communication device 23, a storage device 24, and a control device 25 controlling the overall server computer 20. The operating device 21 is an input device such as a mouse, and a keyboard, where various kinds of operations are inputted. The display device 22 is a display device, such as a liquid crystal display (LCD), which displays various kinds of information. The communication device 23 is a communication device performing communication with external devices, such as the manager MFP 40 (see FIG. 1), and the client MFP 50 (see FIG. 1), via the network. The storage device 24 is a storage device storing programs and various kinds of data, such as a hard disk drive (HDD). The server computer 20 is constituted of an electronic device, for example, such as a personal computer (PC).

The storage device 24 stores a user information table 24a for managing information of a user.

The control device 25 includes, for example, a central processing unit (CPU), a read only memory (ROM) preliminarily storing programs and various kinds of data, and a random access memory (RAM) used as a work area of the CPU. The CPU executes the programs stored in the ROM or storage device 24.

Figure 3:
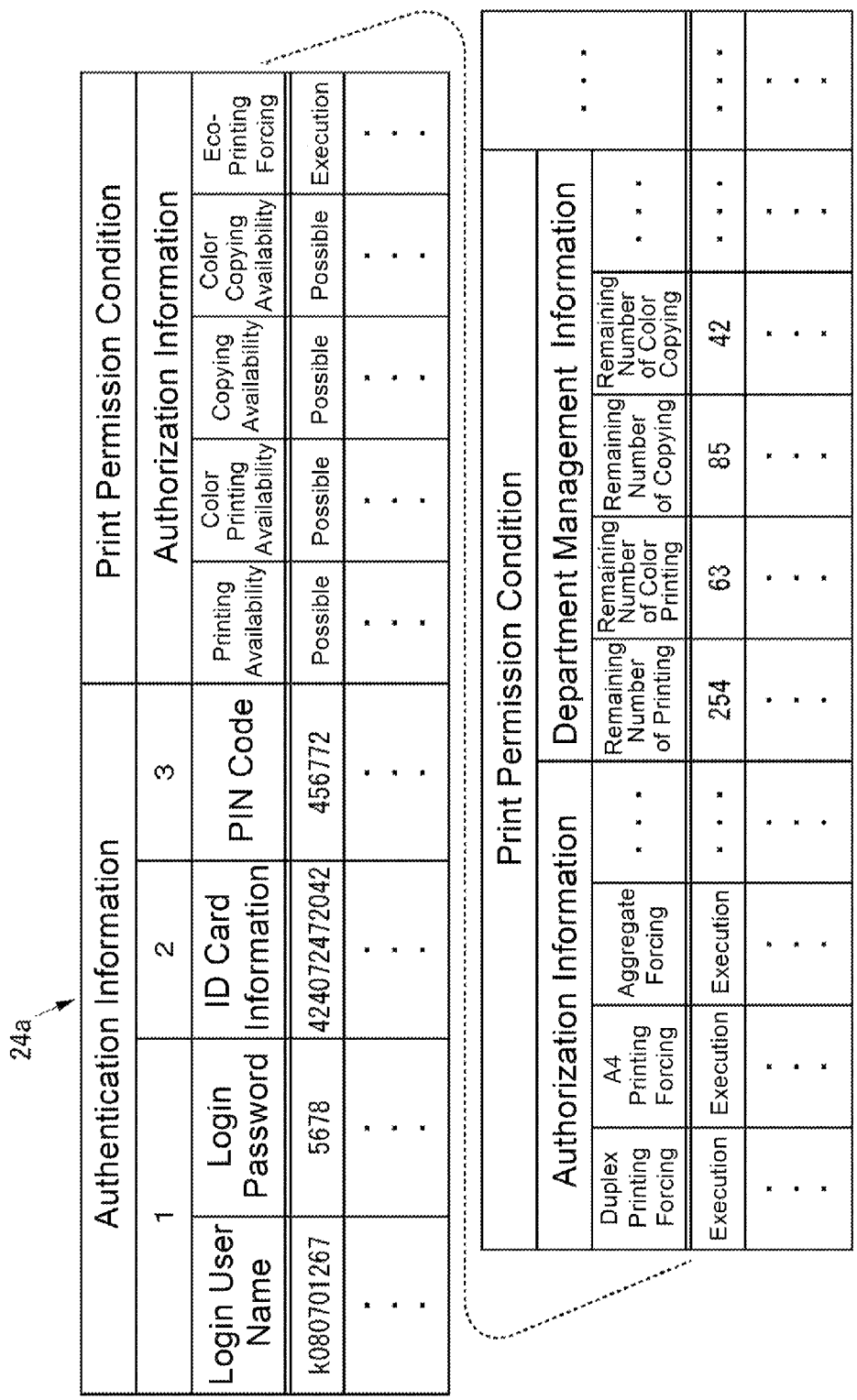
FIG. 3 illustrates an exemplary user information table according to the one embodiment.

FIG. 3 illustrates one example of the user information table 24a.

As illustrated in FIG. 3, the user information table 24a includes, for example, authentication information of users and print permission condition permitted to the users regarding printing, for each user.

As the authentication information, for example, there exist three kinds of information as follows: a combination of a login user name indicative of identification information for login of the user and a login password indicative of a password for login of the user; ID card information of a ID card of the user; and a personal identification number (PIN) code of the user. For example, in an example illustrated in FIG. 3, the login password, the ID card information, and the PIN code of the user with the login user name of "k080701267" are "5678," "424072472042," and "456772," respectively.

As the print permission condition, for example, there exist "authorization information" indicative of authorized functions for the user and "department management information" indicative of a remaining amount of printing permitted to the user.

As the authorization information, for example, there exist the following: "printing availability" indicative of whether or not printing is possible; "color printing availability" indicative of whether or not color printing is possible; "copying availability" indicative of whether or not copying is possible; "color copying availability" indicative of whether or not color copying is possible; "eco-printing forcing" indicative of whether or not eco-printing, which is printing where toner consumption is reduced, is forced; "duplex printing forcing" indicative of whether or not duplex printing, which prints on both sides of a recording medium, is forced; "A4 printing forcing" indicative of whether or not printing to a A4-size recording medium is forced; and "aggregate forcing" indicative of whether or not aggregate print, which aggregately prints a plurality of pages of document data in one page of a recording medium, is forced.

As the department management information, for example, there exist the following: a "remaining number of printing" indicative of a remaining number of sheets of printing permitted to the user; a "remaining number of color printing" indicative of a remaining number of sheets of color printing permitted to the user; a "remaining number of copying" indicative of a remaining number of sheets of copying permitted to the user; and a "remaining number of color copying" indicative of a remaining number of sheets of color copying permitted to the user.

Figure 4:
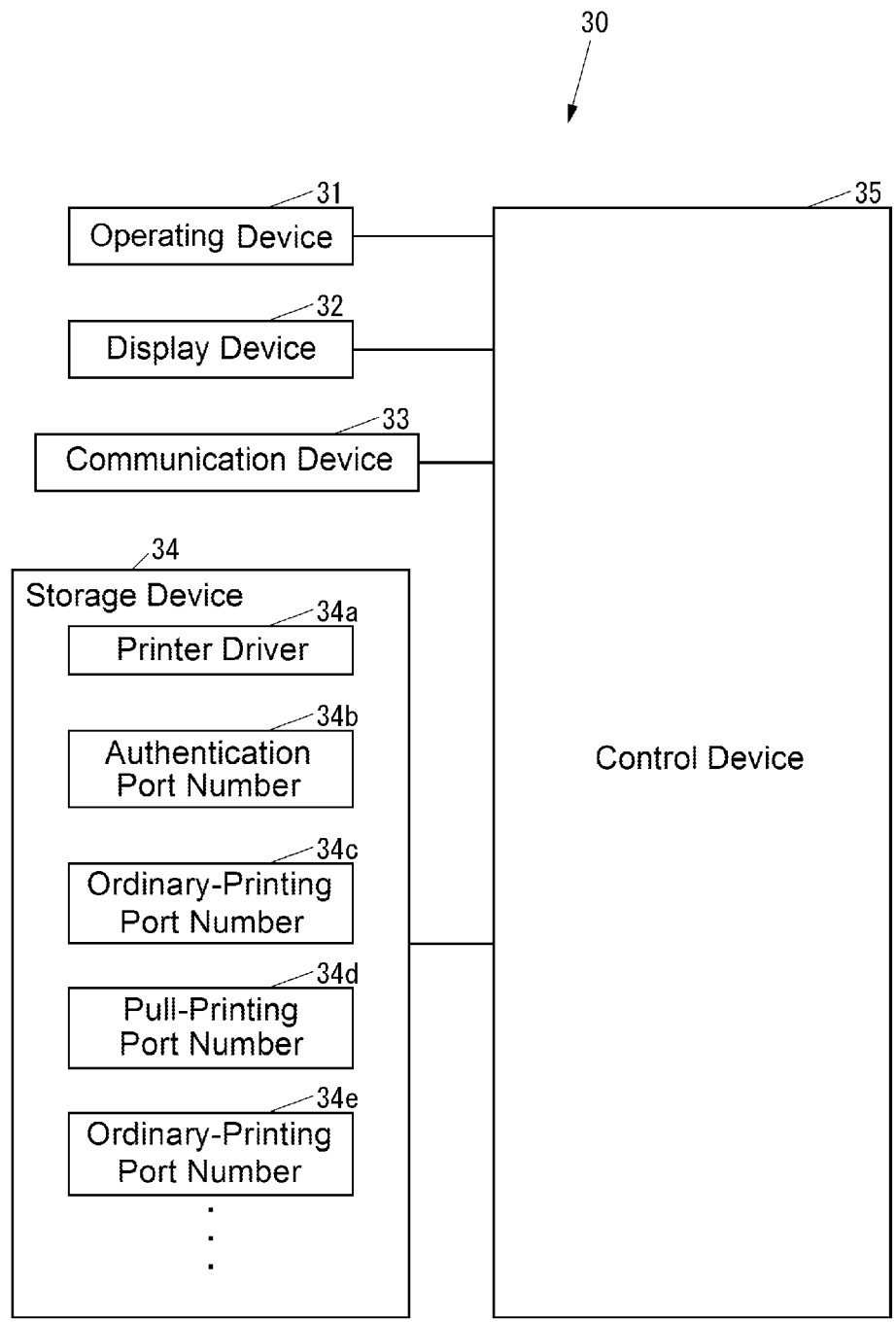
FIG. 4 illustrates a computer according to the one embodiment.

FIG. 4 illustrates the computer 30.

As illustrated in FIG. 4, the computer 30 includes an operating device 31, a display device 32, a communication device 33, a storage device 34, and a control device 35 controlling the overall computer 30. The operating device 31 is an input device such as a mouse, and a keyboard, where various kinds of operations are inputted. The display device 32 is a display device such as a LCD, which displays various kinds of information. The communication device 33 is a communication device performing communication with external devices, such as the manager MFP 40 (see FIG. 1), and the client MFP 50 (see FIG. 1), via the network. The storage device 34 is a storage device storing programs and various kinds of data, such as a HDD. The computer 30 is constituted of an electronic device, for example, such as PC.

The storage device 34 stores a printer driver 34a controlling the MFPs from the computer 30. The printer driver 34a may be installed on the computer 30 at production stage of the computer 30, or may be additionally installed on the computer 30 from a storage medium such as a compact disk (CD), a digital versatile disk (DVD), or a universal serial bus (USB) memory, or may be additionally installed on the computer 30 via the network.

The storage device 34 can store an authentication port number 34b as a port number for authentication of the manager MFP 40 (see FIG. 1) connected to the identical LAN 12. The storage device 34 can store a port number 34c for an ordinary printing (hereinafter referred to as an "ordinary-printing port number") as a first port number of the manager MFP 40 connected to the identical LAN 12. The storage device 34 can store a port number 34d for a pull printing (hereinafter referred to as a "pull-printing port number") as a second port number of the manager MFP 40 connected to the identical LAN 12. The storage device 34 can store an ordinary-printing port number 34e with respect to each client MFP 50 (see FIG. 1) connected to the identical LAN 12, respectively.

The control device 35 includes, for example, a CPU, a ROM preliminarily storing programs and various kinds of data, and a RAM used as a work area of the CPU. The CPU executes the programs stored in the ROM or the storage device 34.

Figure 5:
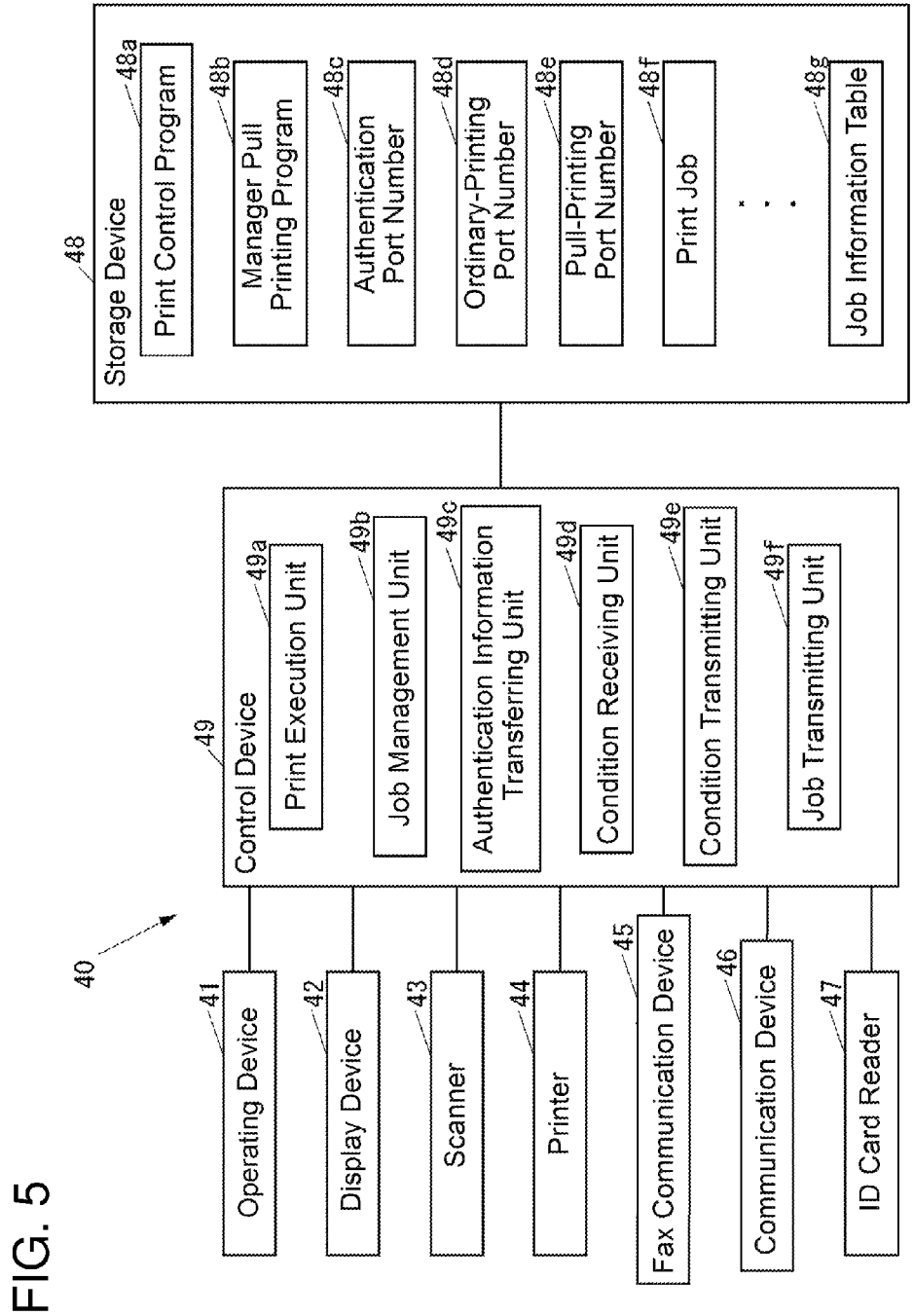
FIG. 5 illustrates a manager MFP according to the one embodiment.

FIG. 5 illustrates the manager MFP 40.

As illustrated in FIG. 5, the manager MFP 40 includes an operating device 41, a display device 42, a scanner 43, a printer 44, a fax communication device 45, a communication device 46, an ID card reader 47, a storage device 48, and a control device 49 controlling the overall manager MFP 40. The operating device 41 is an input device such as a button, where various kinds of operations are inputted. The display device 42 is a display device such as a LCD, which displays various kinds of information. The scanner 43 is a reading device reading an image from a document. The printer 44 is a print device executing printing on a recording medium such as a paper sheet. The fax communication device 45 is a fax device performing fax communication with an external facsimile device (not illustrated) via a communication line such as a dial-up line. The communication device 46 is a communication device performing communication with external devices, such as the server computer 20 (see FIG. 1), the computer 30 (see FIG. 1), and the client MFP 50 (see FIG. 1), via the network. The ID card reader 47 is a card reading device reading ID card information from an ID card. The storage device 48 is a storage device, such as an electrically erasable programmable read only memory (EEPROM), or HDD, which stores various kinds of data.

The storage device 48 stores a print control program 48a for control of execution of a print job and a manager pull printing program 48b for control of pull printing. The print control program 48a and the manager pull printing program 48b may be installed on the manager MFP 40 at production stage of the manager MFP 40, or may be additionally installed on the manager MFP 40 from a storage medium such as a SD card, or a USB memory, or may be additionally installed on the manager MFP 40 via the network.

The storage device 48 can store an authentication port number 48c as a port number for authentication of a user. For example, the authentication port number 48c is "9094."

The storage device 48 can store an ordinary-printing port number 48d and a pull-printing port number 48e. The ordinary-printing port number 48d and the pull-printing port number 48e are different port numbers with one another, and can be arbitrarily set by, for example, an administrator of the manager MFP 40. For example, the ordinary-printing port number 48d and the pull-printing port number 48e are "9100" and "39100," respectively.

The storage device 48 can store a plurality of print jobs 48f transmitted from the computer 30.

The storage device 48 can store a job information table 48g for management of information of the print job 48f.

FIG. 6 illustrates one example of the job information table 48g.

As illustrated in FIG. 6, the job information table 48g includes, for example, the following for each print job 48f: a "job name" indicative of a name of the print job 48f; a "login user name" associated with the print job 48f; a "date and time" when the manager MFP 40 received the print job 48f; and a "size" of the print job 48f. The job information table 48g includes various kinds of setting information relative to the print job 48f for each print job 48f, for example, such as: a "duplex printing setting" indicative of presence or absence of designation of duplex printing in the print job 48f; the "number of pages" of printing designated in the print job 48f; a "color mode" indicative of whether the color of printing, which is designated in the print job 48f, is any of monochrome or color. For example, in the example illustrated in FIG. 6, the login user name, the date and time, the size, the duplex printing setting, the number of pages, and the color mode, which are associated with the print job 48f with the job name of "Word_140513_102723. prn," are "k080701267," "09:08, May 13, 2014," "0.3 MB," "applicable," "9 pages," and "color," respectively.

The control device 49 illustrated in FIG. 5 includes, for example, a CPU, a ROM storing programs and various kinds of data, and a RAM as a main storage device used for a work area of the CPU. The CPU executes the programs stored in the ROM or the storage device 48.

The control device 49 functions as a print execution unit 49a as a manager-side print execution unit executing the print job, which is addressed to the ordinary-printing port number 48d and received by the communication device 46, with the printer 44, by executing the print control program 48a stored in the storage device 48.

The control device 49, by executing the manager pull printing program 48b stored in the storage device 48, functions as: a job management unit 49b managing the print job, which is addressed to the pull-printing port number 48e and received by the communication device 46; an authentication information transferring unit 49c transferring the authentication information, which is transmitted from the client MFP 50 (see FIG. 1), to the server computer 20 (see FIG. 1); a condition receiving unit 49d receiving the print permission condition, which is managed by the server computer 20 with respect to the user authenticated by the server computer 20, from the server computer 20; a condition transmitting unit 49e transmitting the print permission condition, which is received by the condition receiving unit 49d, to the computer 30 (see FIG. 1) or the client MFP 50; and a job transmitting unit 49f transmitting the print job, which is managed by the job management unit 49b, to the client MFP 50.

Figure 7:
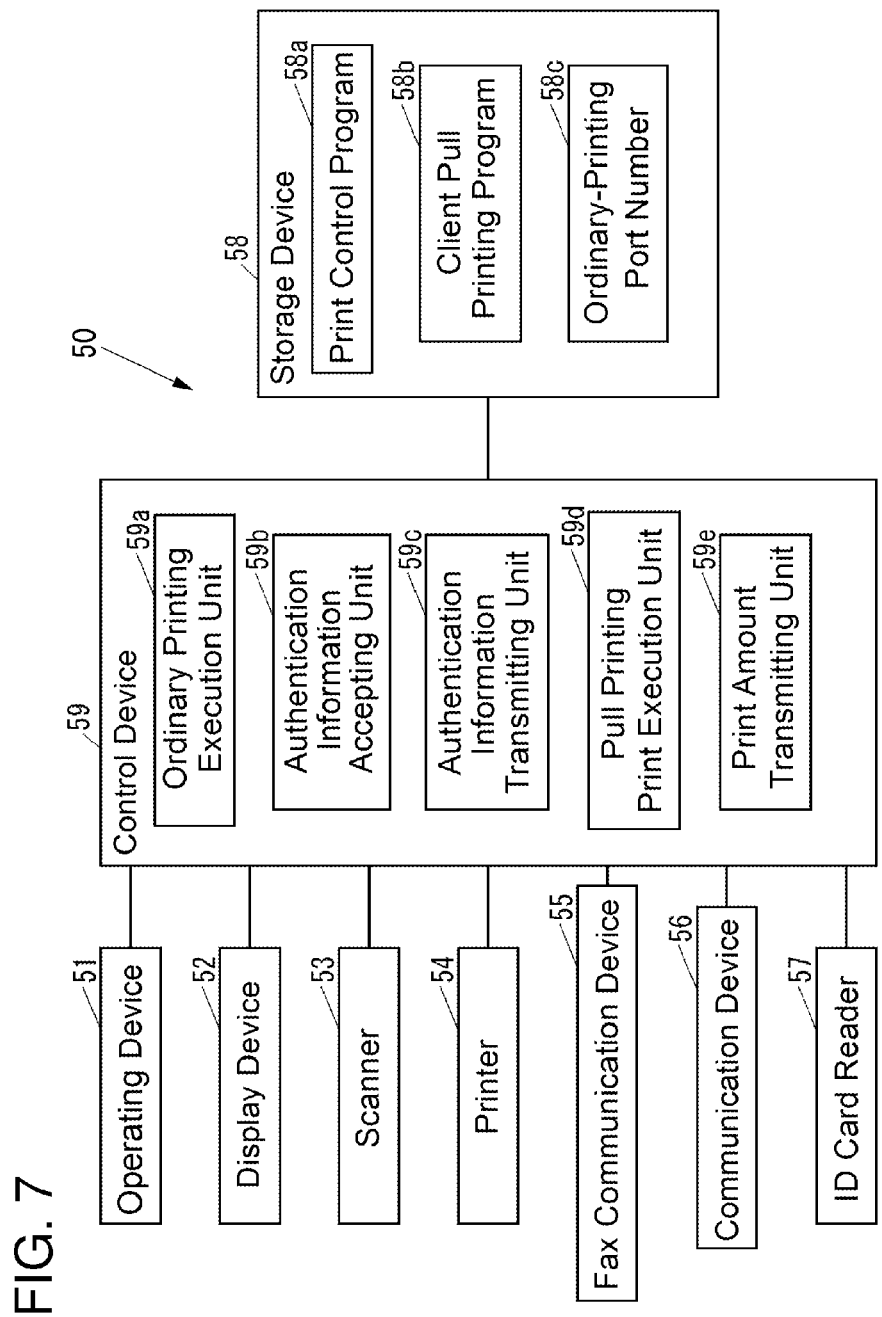
FIG. 7 illustrates a client MFP according to the one embodiment.

FIG. 7 illustrates the client MFP 50.

As illustrated in FIG. 7, similar to the manager MFP 40 (see FIG. 5), the client MFP 50 includes an operating device 51, a display device 52, a scanner 53, a printer 54, a fax communication device 55, a communication device 56, an ID card reader 57, a storage device 58, and a control device 59.

The storage device 58 stores a print control program 58a for controlling the execution of a print job and a client pull printing program 58b for controlling pull printing. The print control program 58a and the client pull printing program 58b may be installed on the client MFP 50 at production stage of the client MFP 50, or may be additionally installed on the client MFP 50 from a storage medium such as a SD card, or a USB memory, or may be additionally installed on the client MFP 50 via the network.

The storage device 58 can store an ordinary-printing port number 58c. The ordinary-printing port number 58c can be arbitrarily set by, for example, an administrator of the client MFP 50. For example, the ordinary-printing port number 58$c$ is "9100."

The control device 59 functions as an ordinary printing execution unit 59$a$ executing a print job, which is addressed to the ordinary-printing port number 58$c$ and received by the communication device 56, with the printer 54, by executing the print control program 58$a$ stored in the storage device 58.

The control device 59, by executing the client pull printing program 58$b$ stored in the storage device 58, functions as: an authentication information accepting unit 59$b$ accepting authentication information; an authentication information transmitting unit 59$c$ transmitting the authentication information, which is accepted by the authentication information accepting unit 59$b$, to the manager MFP 40 (see FIG. 1); a pull printing print execution unit 59$d$ as a client-side print execution unit executing the print job, which is received from the manager MFP 40, with the printer 54; and a print amount transmitting unit 59$e$ transmitting an amount of printing, which is executed by the ordinary printing execution unit 59$a$ or the pull printing print execution unit 59$d$, to the server computer 20 without via the manager MFP 40.

Next, a description will be given of operations of the pull printing system 10.

First, a description will be given of a setting of a port number for authentication by the printer driver 34$a$.

A user can instruct the computer 30 to start a setting of an authentication port number of the manager MFP 40 via the operating device 31 of the computer 30. When the start of the setting of the authentication port number of the manager MFP 40 is instructed, the control device 35 of the computer 30 displays a setting screen 60 illustrated in FIG. 8 on the display device 32.

Figure 8:
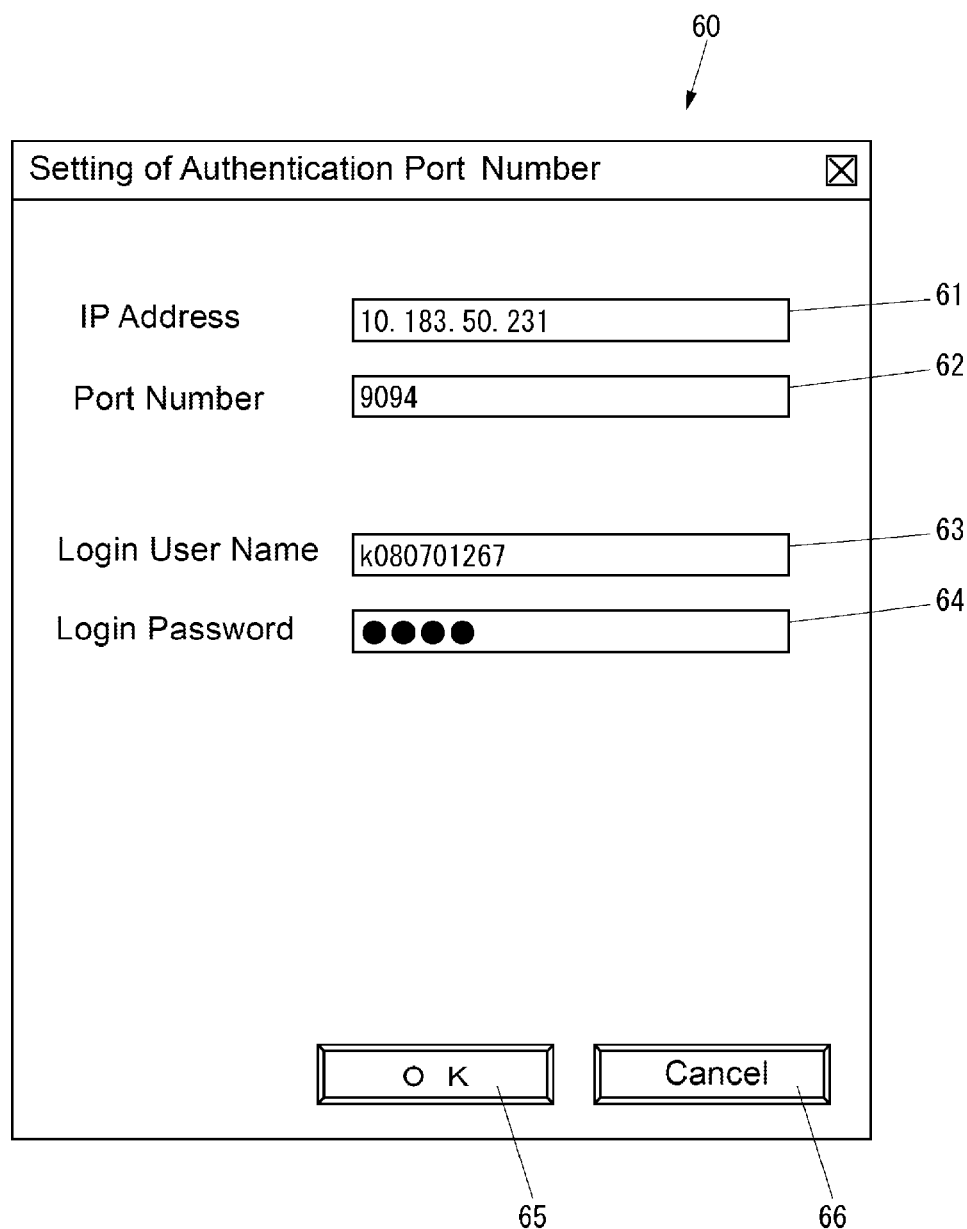
FIG. 8 illustrates an exemplary setting screen of a port number for authentication by a printer driver according to the one embodiment.

FIG. 8 illustrates one example of the setting screen 60 of the port number for authentication by the printer driver 34$a$.

The setting screen 60 illustrated in FIG. 8 includes the following: a text box 61 for input of an Internet Protocol (IP) address of a setting-target MFP; a text box 62 for input of a authentication port number of the setting-target MFP; a text box 63 for input of a login user name; a text box 64 for input of a login password; an OK button 65 for making the setting effective; and a cancel button 66 to abort the setting.

The user can input the port number, which is notified, for example, from the administrator of the manager MFP 40 as the authentication port number of the manager MFP 40, in the text box 62.

When the OK button 65 in the setting screen 60 is pressed, the control device 35 stores the IP address, the port number, the login user name, and the login password inputted in the text boxes 61, 62, 63, 64, respectively, in the storage device 34. Especially, the control device 35 stores the port number inputted in the text box 62 as the authentication port number 34$b$ in the storage device 34.

Next, a description will be given of a setting of a port number for printing by the printer driver 34$a$.

The user can instruct the computer 30 to start a setting of a pull-printing port number of the manager MFP 40 via the operating device 31 of the computer 30. When the start of the setting of the pull-printing port number of the manager MFP 40 is instructed, the control device 35 of the computer 30 displays a setting screen 70 illustrated in FIG. 9 on the display device 32.

Figure 9:
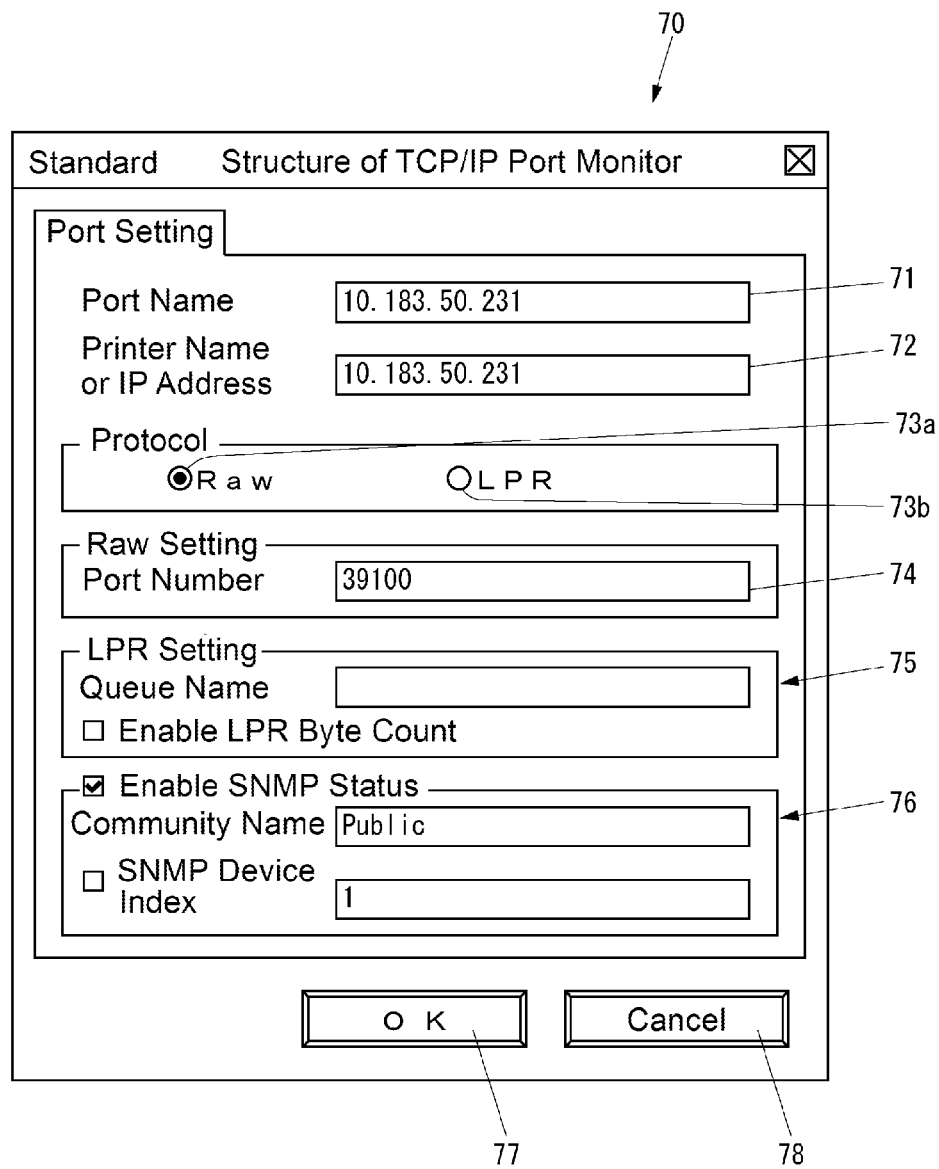
FIG. 9 illustrates an exemplary setting screen of a port number for printing by a printer driver according to the one embodiment.

FIG. 9 illustrates one example of the setting screen 70 of the port number for printing by the printer driver 34$a$.

The setting screen 70 illustrated in FIG. 9 includes a text box 71, a text box 72, a radio button 73$a$, a radio button 73$b$, a text box 74, a setting region 75, a setting region 76, an OK button 77, and a cancel button 78 to abort the setting. The text box 71 is a text box to input a name of a setting-target port. The text box 72 is a text box to input a name of a setting-target MFP or an IP address. The radio button 73$a$ is a radio button to select the Raw as a communication protocol with the setting-target MFP. The radio button 73$b$ is a radio button to select the Line Printer daemon protocol (LPR) as the communication protocol with the setting-target MFP. The text box 74 is a text box to input a port number used when communicating with the setting-target MFP via the Raw protocol. The setting region 75 is a region when communicating with the setting-target MFP via the LPR. The setting region 76 is a region related to the simple network management protocol (SNMP). The OK button 77 is a button to make the setting effective. The radio button 73$a$ and the radio button 73$b$ become a state where only any one of them is always selected.

In the setting screen 70, after the user inputs the IP address of the manager MFP 40 in the text box 72, selects the radio button 73$a$, and inputs the port number, which is notified, for example, from the administrator of the manager MFP 40 as the pull-printing port number of the manager MFP 40, in the text box 74, the user can instruct to set the pull-printing port number of the manager MFP 40 by the printer driver 34$a$, by pressing the OK button 77.

When the setting of the pull-printing port number of the manager MFP 40 by the printer driver 34$a$ is instructed, the control device 35 stores the port number, which has been designated in the text box 74, in the storage device 34 as a pull-printing port number 34$d$.

The above has described the setting of the pull-printing port number of the manager MFP 40 by the printer driver 34$a$, the same applies to a setting of an ordinary-printing port number of the manager MFP 40 by the printer driver 34$a$ and a setting of an ordinary-printing port number of the client MFP 50 by the printer driver 34$a$.

Next, a description will be given of the operations of the pull printing system 10 when printing is executed.

First, a description will be given of the operations of the pull printing system 10 when execution of printing is instructed via the operating device 31 of the computer 30.

Figure 10:
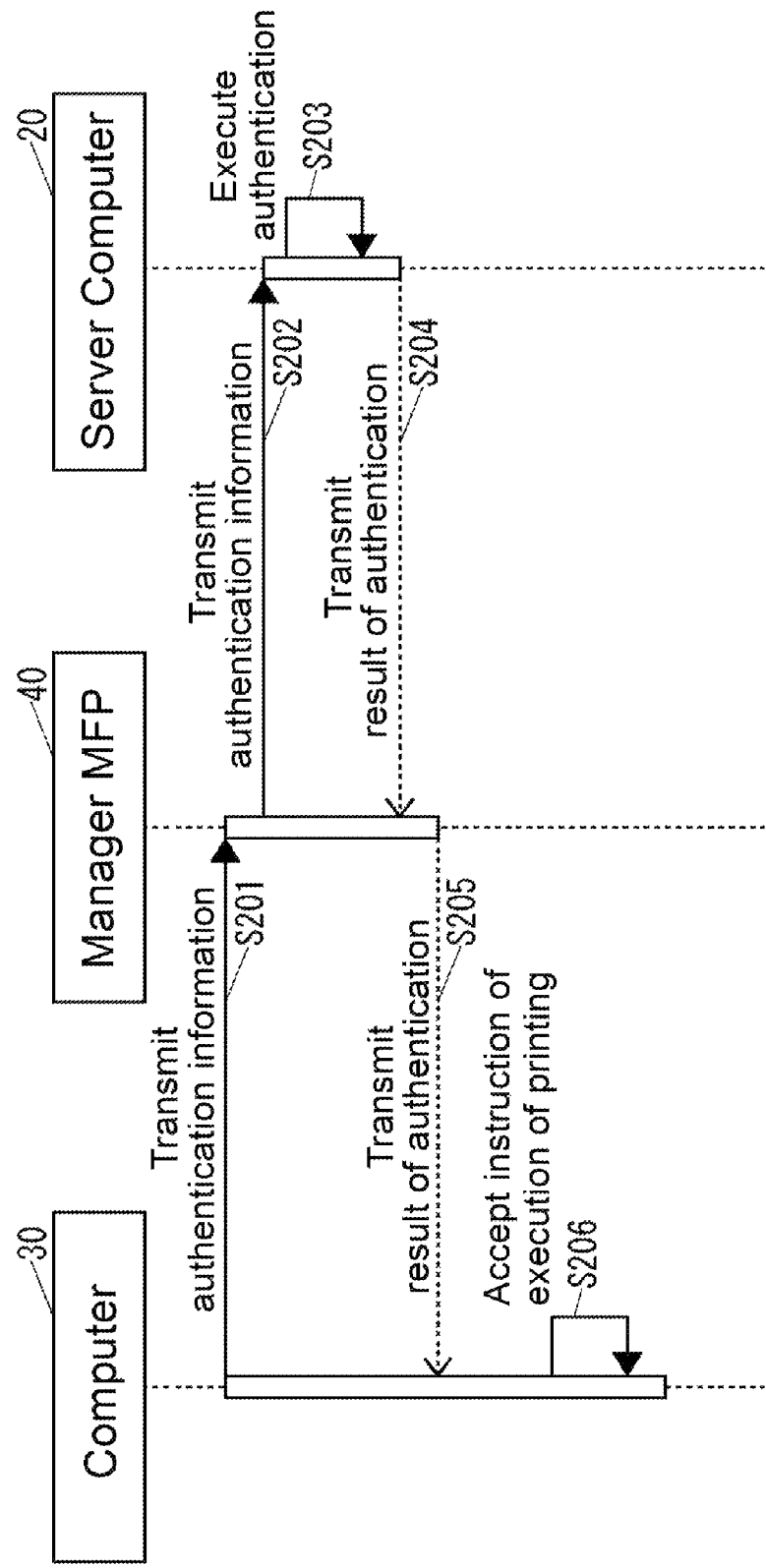
FIG. 10 illustrates operations of the pull printing system according to the one embodiment when execution of printing is instructed via an operating device of the computer.

FIG. 10 illustrates the operations of the pull printing system 10 when the execution of printing is instructed via the operating device 31 of the computer 30.

As illustrated in FIG. 10, when a start of print setting is instructed, the control device 35 of the computer 30 transmits the authentication information, which is namely a combination of the login user name and login password having been set in the setting screen 60 illustrated in FIG. 8, with respect to the IP address having been set in the setting screen 60 illustrated in FIG. 8, to the port number having been set in the setting screen 60 illustrated in FIG. 8, namely to the authentication port number 34$b$ (Step S201). That is, the control device 35 requests authentication of the user from the manager MFP 40 by execution of the printer driver 34$a$.

The control device 49 of the manager MFP 40 transfers the authentication information transmitted in Step S201, namely the combination of the, login user name and login password to the server computer 20 (Step S202). That is, the control device 49 requests the authentication of the user from the server computer 20.

The control device 25 of the server computer 20 executes the authentication of the user based on the authentication information transmitted in Step S202 and the authentication information on the user information table 24*a* (Step S203). Here, when identical authentication information with the authentication information transmitted in Step S202 exists in the authentication information on the user information table 24*a*, the control device 25 determines that the authentication of the user has succeeded.

After the process of Step S203, the control device 25 of the server computer 20 transmits the result of the authentication in Step S203 to the manager MFP 40 (Step S204). Here, when the authentication of the user has succeeded in Step S203, the control device 25 transmits a print permission condition, which is set in the user information table 24*a* with respect to the user to whom the authentication has succeeded, to the manager MFP 40 as the result of the authentication.

The condition receiving unit 49*d* of the manager MFP 40 is a unit that receives the result of the authentication transmitted in Step S204. Here, the condition receiving unit 49*d* receives the print permission condition when the print permission condition is transmitted as the result of the authentication in Step S204. Then, the condition transmitting unit 49*e* of the manager MFP 40 is a unit that transmits the result of the authentication received by the condition receiving unit 49*d* to the computer 30 (Step S205). Here, the condition transmitting unit 49*e* transmits the print permission condition to the computer 30 as the result of the authentication when the print permission condition is received by the condition receiving unit 49*d*.

When the print permission condition is transmitted in Step S205, the control device 35 of the computer 30 accepts only the instruction of execution of printing, which corresponds to the transmitted print permission condition (Step S206).

For example, the control device 35 does not accept printing when "printing availability" is set "impossible" in the print permission condition. The control device 35 does not accept color printing when "color printing availability" is set "impossible" in the print permission condition. The control device 35 accepts only eco-printing when "eco-printing forcing" is set "execution" in the print permission condition. The control device 35 accepts only duplex printing when "duplex printing forcing" is set "execution" in the print permission condition. The control device 35 accepts only A4-size printing when "A4 printing forcing" is set "execution" in the print permission condition. The control device 35 accepts only aggregate print when "aggregate forcing" is set "execution" in the print permission condition.

The control device 35 accepts printing within a range of a "remaining number of printing" in the print permission condition. The control device 35 accepts color printing within a range of a "remaining number of color printing" in the print permission condition.

Next, a description will be given of the operations of the pull printing system 10 in a case of ordinary printing.

Figure 11:
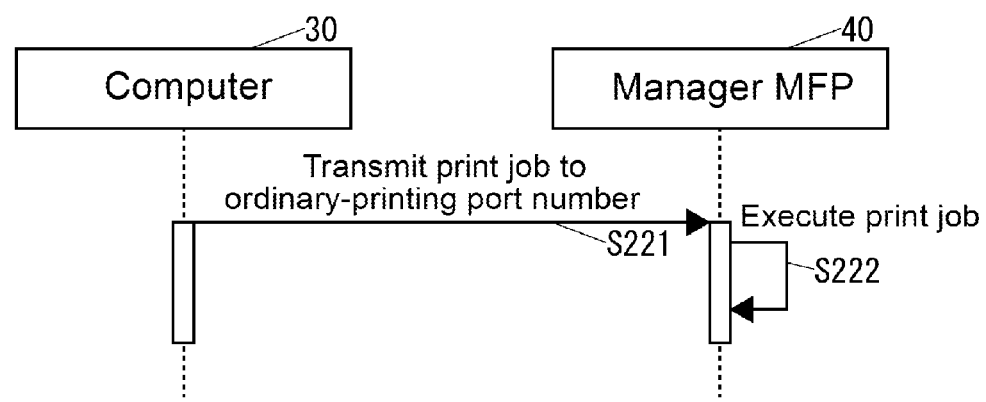
FIG. 11 illustrates the operations of the pull printing system according to the one embodiment when an ordinary printing is executed by the manager MFP.

FIG. 11 illustrates the operations of the pull printing system 10 when ordinary printing is executed by the manager MFP 40.

As illustrated in FIG. 11, when the control device 35 of the computer 30 accepts the instruction, which causes the manager MFP 40 to execute printing, in Step S206, the control device 35 of the computer 30 transmits the print job, which corresponds to the accepted instruction, with respect to the manager MFP 40 to the ordinary-printing port number 34*c* stored in the storage device 34 (Step S221).

Then, when the destination of the print job received by the communication device 46 and the ordinary-printing port number 48*d* stored in the storage device 48 are identical, namely the print job to the ordinary-printing port number 48*d* is received by the communication device 46, the print execution unit 49*a* of the manager MFP 40 executes the print job received by the communication device 46 with the printer 44 (Step S222).

The above has described the ordinary printing by the manager MFP 40, the same applies to the ordinary printing by the client MFP 50.

Next, a description will be given of the operations of the pull printing system 10 when a print job is managed by the manager MFP 40.

Figure 12:
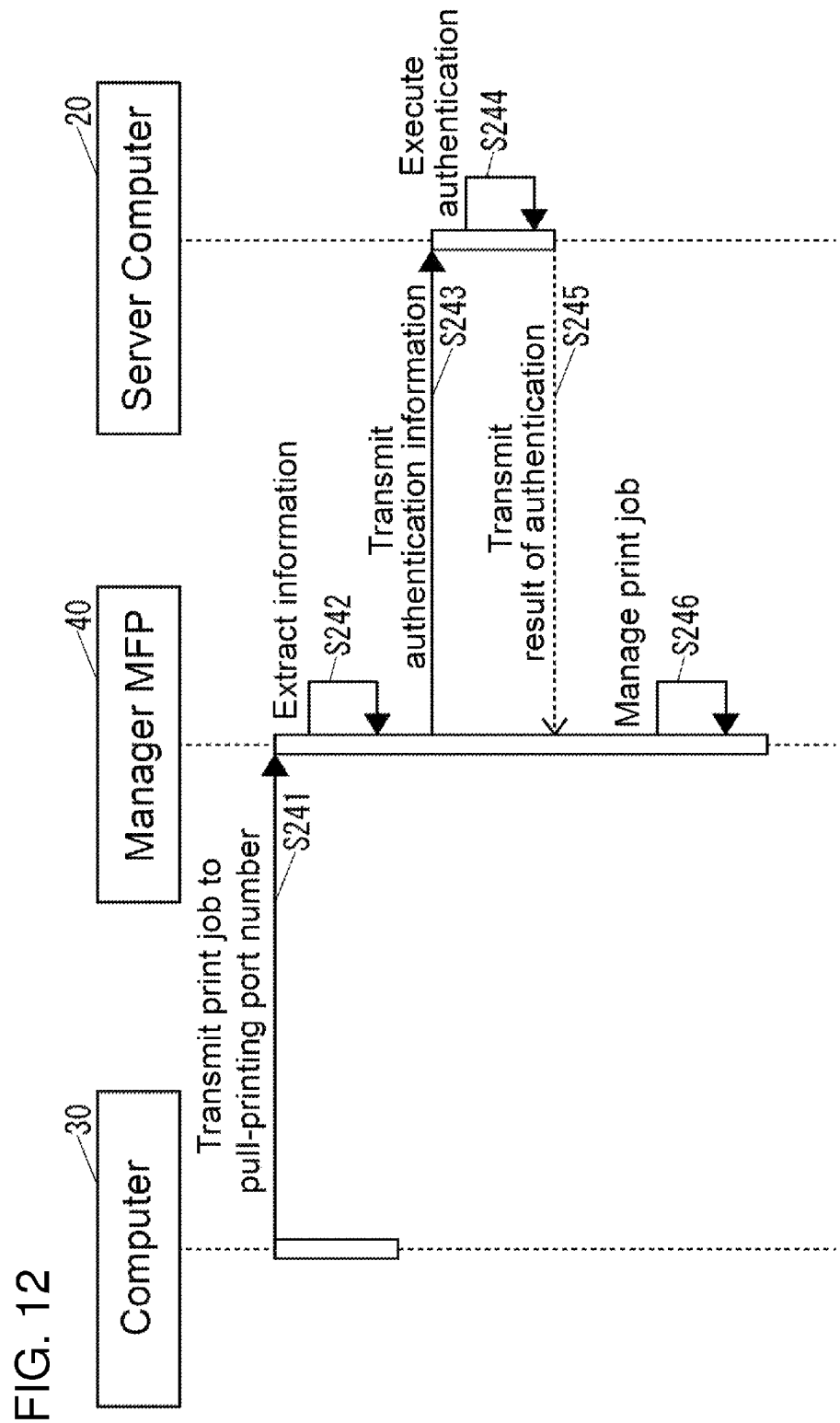
FIG. 12 illustrates the operations of the pull printing system according to the one embodiment when a print job is managed by the manager MFP.

FIG. 12 illustrates the operations of the pull printing system 10 when a print job is managed by the manager MFP 40.

As illustrated in FIG. 12, when the control device 35 of the computer 30 accepts the instruction of the pull printing in Step S206, the control device 35 of the computer 30 transmits the print job, which corresponds to the accepted instruction, with respect to the manager MFP 40 to the pull-printing port number 34*d* stored in the storage device 34 (Step S241). At this time, the control device 35 assigns the following commands for Printer Job Language (PJL) of the print job, which is transmitted to the pull-printing port number in the manager MFP 40.

```
@PJL SET KLOGINID="k080701267"
@PJL SET KLOGINPWD="5678"
@PJL SET JOBNAME="Test job"
@PJL COMMENT="INFO: NUP 1; DUPLEX OFF; QTY 1;
COLORMODE COLOR."
```

The command in the first line is the command setting the value "k080701267" for the parameter "KLOGINID" indicative of the login user name. The value "k080701267" is one example and, in practice, is the login user name having been set in the setting screen 60 illustrated in FIG. 8.

The command in the second line is the command setting the value "5678" for the parameter "KLOGINPWD" indicative of the login password. The value "5678" is one example and, in practice, is the login password having been set in the setting screen 60 illustrated in FIG. 8.

The command in the third line is the command setting the value "Test job" for the parameter "JOBNAME" indicative of the job name. The value "Test job" is one example and, in practice, is any name designated by the user.

The command in the fourth line is the command setting the duplex printing setting, the number of pages, and the color mode. In this example, the duplex printing setting (DUPLEX) is set no execution (OFF). The number of pages (QTY) is set one page. The color mode (COLORMODE) is set color (COLOR). In practice, the setting, which is accepted in Step S206, is reflected.

Then, when the destination of the print job received by the communication device 46 and pull-printing port number 48*e* stored in the storage device 48 are identical, namely, the print job to the pull-printing port number 48*e* is received by the communication device 46, the job management unit 49*b* of the manager MFP 40 is a unit that extracts the information set in the commands, which are assigned to the PJL of the print job in Step S241 (Step S242).

Next, the job management unit 49*b* transmits the authentication information, among the extracted information in Step S242, namely, the combination of the login user name and the login password set for the parameters "KLOGINID" and "KLOGINPWD," respectively, to the server computer 20 (Step S243). That is, the job management unit 49*b* requests authentication of the user from the server computer 20.

The control device 25 of the server computer 20 executes authentication of the user based on the authentication information transmitted in Step S202 and the authentication information on the user information table 24*a* (Step S244). Here, when the identical authentication information with the authentication information transmitted in Step S243 exists in the authentication information on the user information table 24*a*, the control device 25 determines that the authentication of the user has succeeded.

The control device 25 of the server computer 20, after the process in Step S244, transmits the result of the authentication in Step S244 to the manager MFP 40 (Step S245).

when the result of the authentication transmitted in Step S245 is success of the authentication, the job management unit 49*b* of the manager MFP 40 manages the print job transmitted from the computer 30 in Step S241 as the print job 48*f* (Step S246). Here, the job management unit 49*b* adds the print job to the job information table 48*g* based on the "job name," the "login user name," the "duplex printing setting," the "number of pages," and the "color mode" among the extracted information in step S242.

Next, a description will be given of the operations of the pull printing system 10 when login is performed from the client MFP 50.

Figure 13:
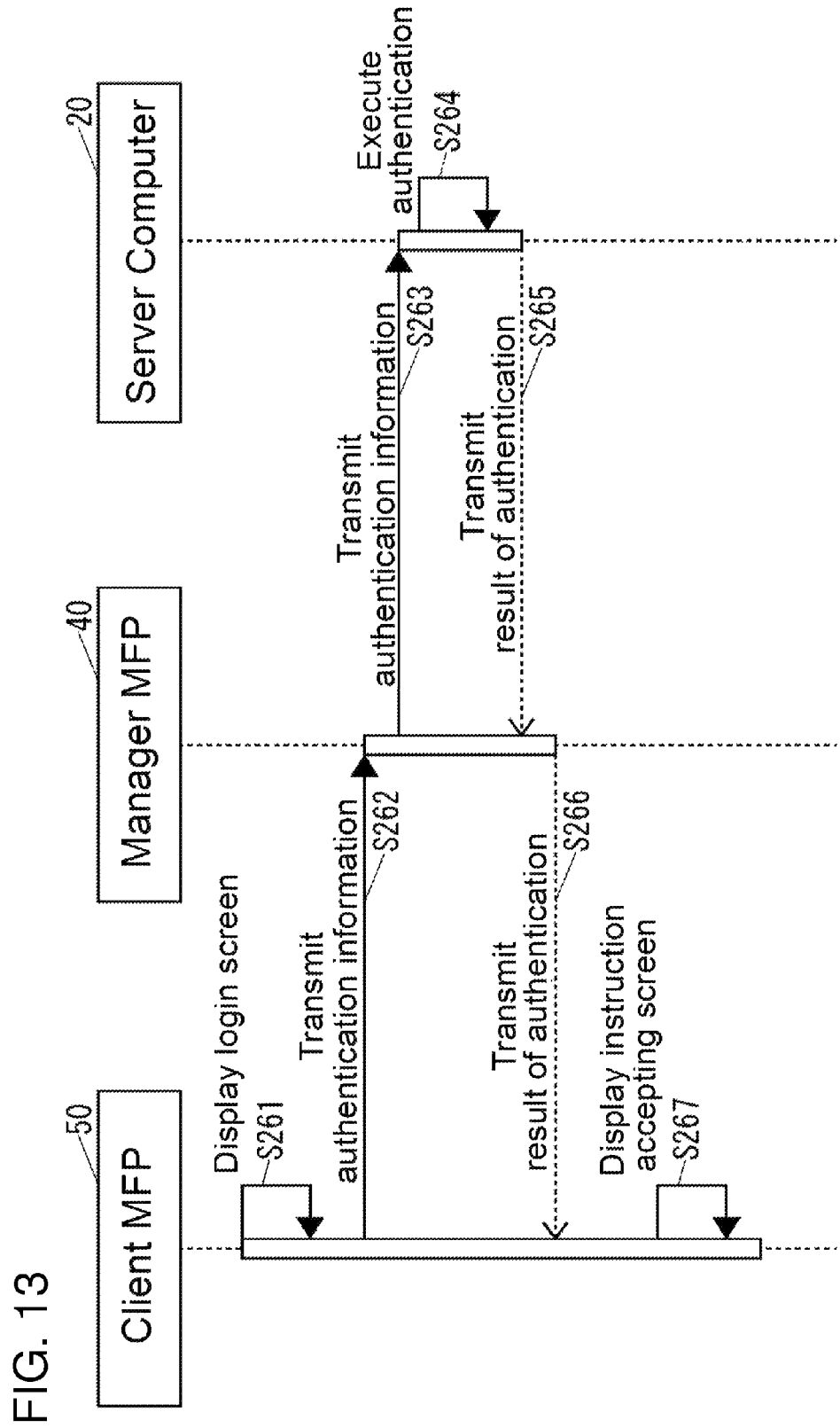
FIG. 13 illustrates the operations of the pull printing system according to the one embodiment when a user logs in from the client MFP.

FIG. 13 illustrates the operations of the pull printing system 10 when login is performed from the client MFP 50.

Figure 14:
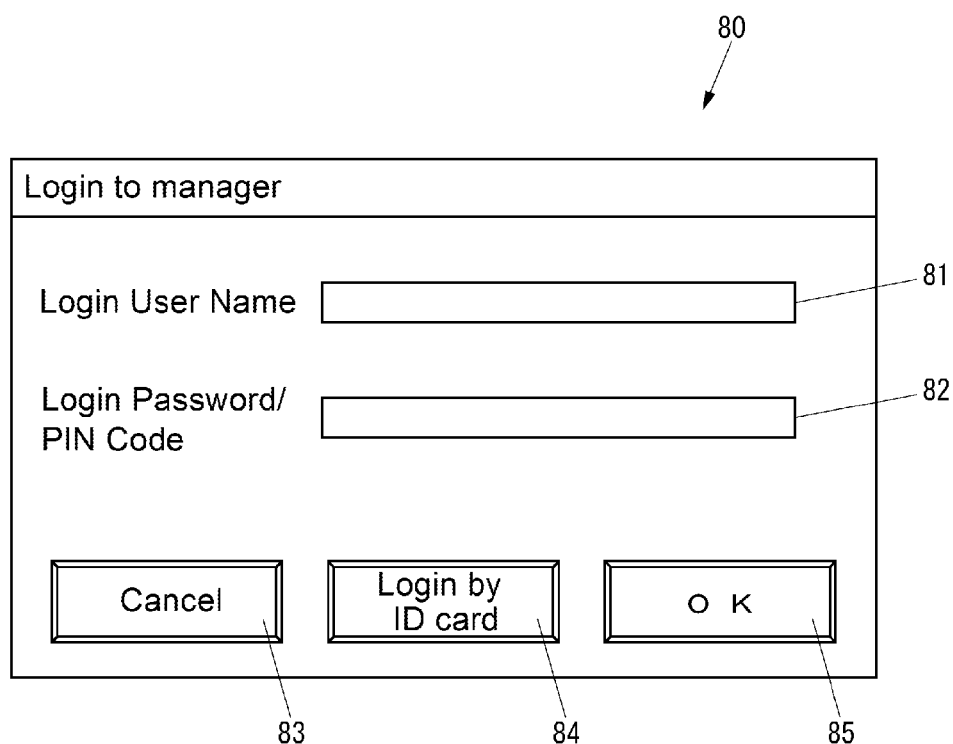
FIG. 14 illustrates an exemplary login screen displayed on a display device according to the one embodiment.

As illustrated in FIG. 13, the authentication information accepting unit 59*b* of the client MFP 50 is a unit that displays a login screen 80 on the display device 52, as illustrated in FIG. 14 for login to the manager MFP 40 (Step S261).

FIG. 14 illustrates one example of the login screen 80.

The login screen 80 illustrated in FIG. 14 includes the following: a text box 81 for input of a login user name; a text box 82 for input of a login password or a PIN code; a cancel button 83 to abort a process; a button 84 to log in by an ID card; and an OK button 85 to continue a process.

The user can instruct the client MFP 50 on login to the manager MFP 40 with the combination of the login user name inputted in text box 81 and the login password inputted in text box 82 as the authentication information, by input of the login user name and the login password in the text box 81 and the text box 82, respectively and a press of the OK button 85. By inputting the PIN code in the text box 82 and pressing the OK button 85, the user can instruct the client MFP 50 on login to the manager MFP 40 with the PIN code inputted in the text box 82 as the authentication information. By setting the ID card in the ID card reader 57 and pressing the button 84 in the login screen 80, the user can instruct the client MFP 50 on login to the manager MFP 40 with the ID card information read from the ID card by the ID card reader 57 as the authentication information.

As illustrated in FIG. 13, when login to the manager MFP 40 is instructed with the login screen 80 illustrated in FIG. 14, the authentication information transmitting unit 59*c* of the client MFP 50 is a unit that transmits the authentication information inputted by the user to the manager MFP 40 (Step S262). Here, the communication between the manager MFP 40 and the client MFP 50 is ensured with use of Web service.

The authentication information transferring unit 49*c* of the manager MFP 40 is a unit that transfers the authentication information transmitted in Step S262 to the server computer 20 (Step S263). That is, the authentication information transferring unit 49*c* requests the authentication of the user from the server computer 20.

The control device 25 of the server computer 20 executes authentication of the user based on the authentication information transmitted in Step S263 and the authentication information on the user information table 24*a* (Step S264). Here, when the identical authentication information with the authentication information transmitted in Step S263 exists in the authentication information on the user information table 24*a*, the control device 25 determines that the authentication of the user has succeeded.

The control device 25 of the server computer 20, after the process in Step S264, transmits the result of the authentication in Step S264 to the manager MFP 40 (Step S265). Here, when the authentication of the user has succeeded in Step S264, the control device 25 transmits the print permission condition, which is set in the user information table 24*a* with respect to the user to whom the authentication has succeeded, to the manager MFP 40 as the result of the authentication.

The condition receiving unit 49*d* of the manager MFP 40 receives the result of the authentication transmitted in Step S265. Here, the condition receiving unit 49*d* receives the print permission condition when the print permission condition is transmitted as the result of the authentication in Step S265. Then, the condition transmitting unit 49*e* of the manager MFP 40 transmits the result of the authentication received by the condition receiving unit 49*d* to the client MFP 50 (Step S266). Here, the condition transmitting unit 49*e* transmits the print permission condition to the client MFP 50 as the result of the authentication when the print permission condition is received by the condition receiving unit 49*d*.

Figure 15:
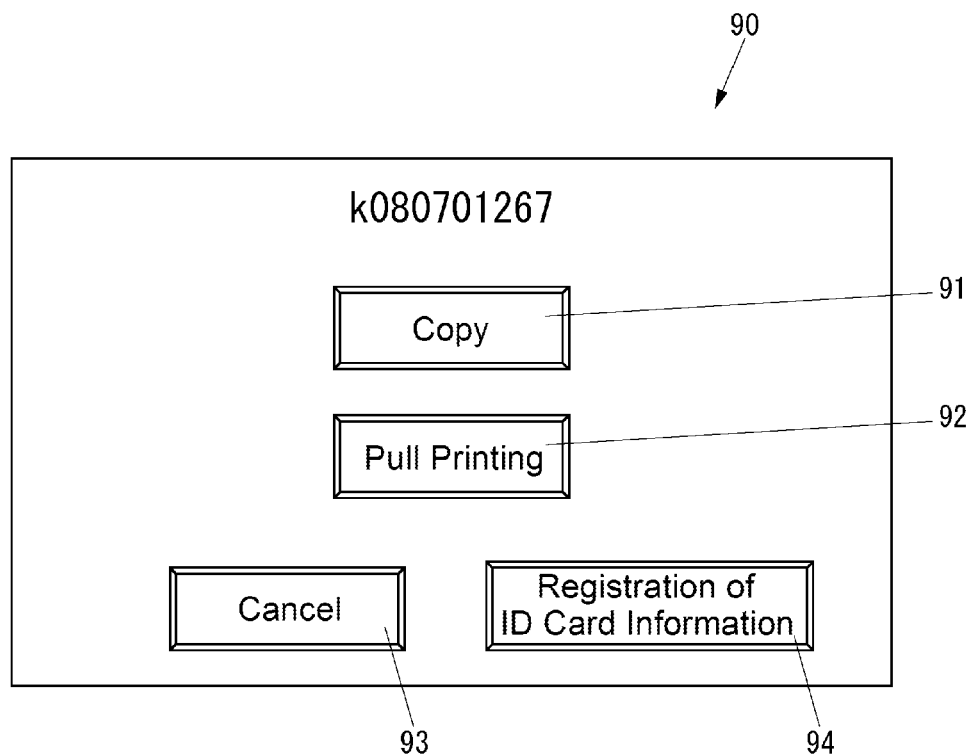
FIG. 15 illustrates an exemplary instruction accepting screen displayed on the display device according to the one embodiment.

When the print permission condition is transmitted in Step S266, the control device 59 of the client MFP 50 displays an instruction accepting screen 90 as illustrated in FIG. 15 on the display device 52 (Step S267).

FIG. 15 illustrates one example of the instruction accepting screen 90.

The instruction accepting screen 90 illustrated in FIG. 15 includes the following: a copy button 91 to accept an instruction of execution of copying; a pull printing button 92 to accept an instruction of execution of pull printing; a cancel button 93 to abort a process; and a button 94 to register ID card information.

Next, a description will be given of the operations of the pull printing system 10 in a case of pull printing.

Figure 16:
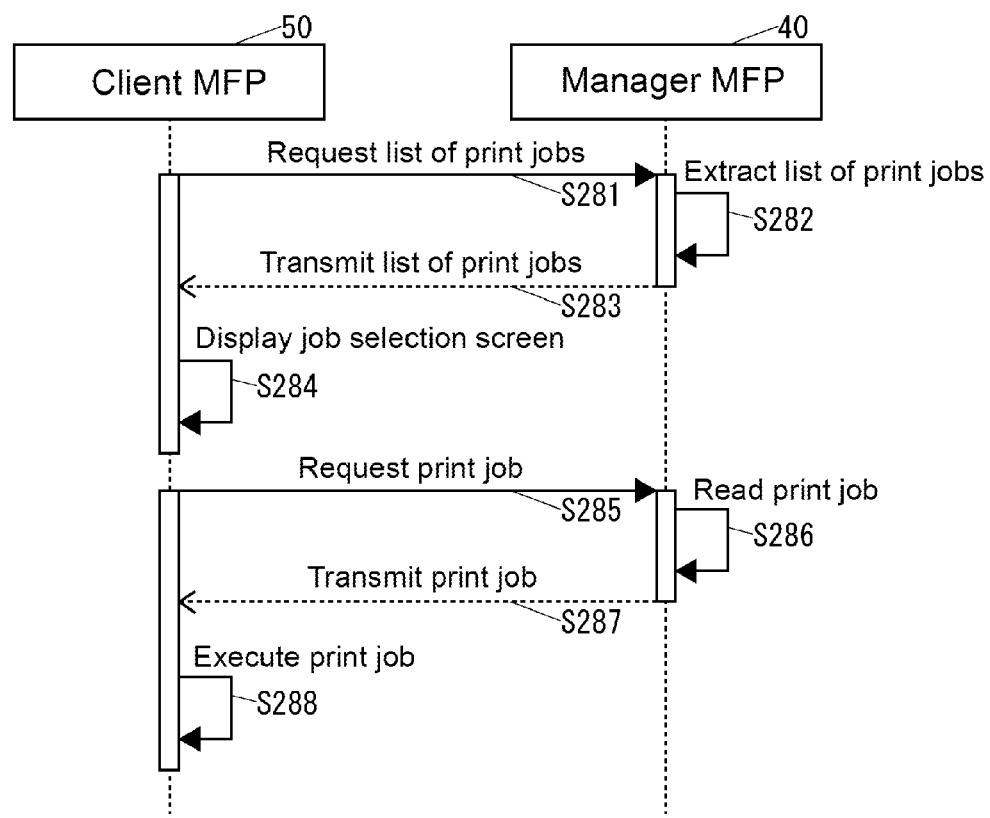
FIG. 16 illustrates the operations of the pull printing system according to the one embodiment in pull printing.

FIG. 16 illustrates the operations of the pull printing system 10 in a case of pull printing.

As illustrated in FIG. 16, when the pull printing button 92 in the instruction accepting screen 90 is pressed, the control device 59 of the client MFP 50 requests a list of print jobs of the logged-in user, among the print jobs managed by the manager MFP 40, from the manager MFP 40 (Step S281).

When the list of print jobs of the logged-in user is requested from the client MFP 50, the job management unit 49*b* of the manager MFP 40 extracts a list of print jobs, which are associated with the login user name of the logged-in user in the client MFP 50, in the job information table 48*g* (Step S282).

Next, the job management unit 49*b* transmits the list of print jobs extracted in Step S282 to the client MFP 50 (Step S283). Here, the list of print jobs transmitted to the client MFP 50 includes the following: the job name of the target print job; the date and time when the manager MFP 40 received the target print job; and the size of the target print job. The list of print jobs transmitted to the client MFP 50 includes information on various kinds of settings relative to the target print job such as the "duplex printing setting," the "number of pages," and the "color mode" of the target print job.

Figure 17:
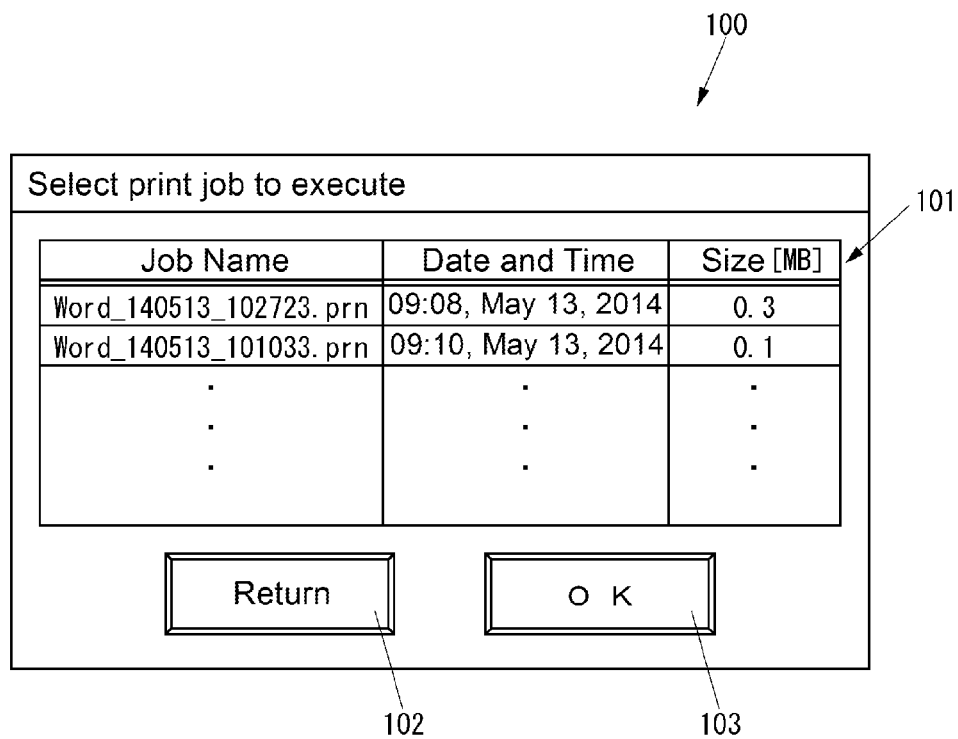
FIG. 17 illustrates an exemplary job selection screen displayed on the display device according to the one embodiment.

When the client MFP 50 receives the list of print jobs transmitted from the manager MFP 40, the control device 59 of the client MFP 50 displays a job selection screen 100 illustrated in FIG. 17 on the display device 52 (Step S284).

FIG. 17 illustrates one example of the job selection screen 100.

The job selection screen 100 illustrated in FIG. 17 includes the following: a job list region 101 to display the list of print jobs received from the manager MFP 40; a button 102 to return to the instruction accepting screen 90; and an OK button 103 to continue a process.

In the job selection screen 100, the user can select at least one print job in the job list region 101 and press the OK button 103. That is, the user can instruct the client MFP 50 to execute the selected print job.

Here, the control device 59 of the client MFP 50 accepts only the instruction of execution of the print job, which corresponds to the print permission condition transmitted in Step S266.

For example, the control device 59 does not accept the instruction of the execution of the print job when "printing availability" is set "impossible" in the print permission condition. The control device 59 does not accept the instruction of the execution of the print job where "color" is set as a "color mode" when "color printing availability" is set "impossible" in the print permission condition. The control device 59 accepts only the instruction of the execution of the print job where eco-printing is set when "eco-printing forcing" is set "execution" in the print permission condition. The control device 59 accepts only the instruction of the execution of the print job where duplex printing is set when "duplex printing forcing" is set "execution" in the print permission condition. The control device 59 accepts only the instruction of the execution of the print job where A4-size printing is set when "A4 printing forcing" is set "execution" in the print permission condition. The control device 59 accepts only the instruction of the execution of the print job where aggregate print is set when "aggregate forcing" is set "execution" in the print permission condition.

The control device 59 accepts only the instruction of the execution of the print job where the "number of pages" is set within a range of "remaining number of printing" in the print permission condition. The control device 59 accepts only the instruction of the execution of the print job where the "number of pages" is set within a range of "remaining number of color printing" in the print permission condition, regarding the print job where "color" is set as a "color mode."

As illustrated in FIG. 16, the control device 59 of the client MFP 50 requests the print job from the manager MFP 40 by transmitting the job name of the print job, which was selected in the job list region 101 when the OK button 103 was pressed, to the manager MFP 40 (Step S285).

When the manager MFP 40 receives the job name transmitted from the client MFP 50, the job transmitting unit 49f of the manager MFP 40 is a unit that reads the print job 48f, to which the received job name is attached, from the storage device 48 (Step S286) and transmits the read print job to the client MFP 50 (Step S287).

When the client MFP 50 receives the print job transmitted from manager MFP 40, the pull printing print execution unit 59d of the client MFP 50 executes the received print job with the printer 54 (Step S288). That is, the pull printing print execution unit 59d executes pull printing.

Although the above has described the case where the print job, which is managed by the manager MFP 40, is executed from the client MFP 50, the similar operations also ensure that a print job, which is managed by the manager MFP 40, is executed from the manager MFP 40 itself.

Although the above has described the case where the pull printing button 92 is pressed in the instruction accepting screen 90, the user can press the copy button 91 in the instruction accepting screen 90.

When the copy button 91 in the instruction accepting screen 90 is pressed, the control device 59 of the client MFP 50 executes "copying," where an image, which is read from a document by the scanner 53, is printed with the printer 54.

Here, the control device 59 accepts only the instruction of the execution of copying, which corresponds to the print permission condition transmitted in Step S266.

For example, the control device 59 does not accept the instruction of the execution of copying when the "copying availability" is set "impossible" in the print permission condition. The control device 59 does not accept the instruction of the execution of color copying when the "color copying availability" is set "impossible" in the print permission condition. The control device 59 accepts only the instruction of the execution of copying where eco-printing is designated when the "eco-printing forcing" is set "execution" in the print permission condition. The control device 59 accepts only the instruction of the execution of copying where duplex printing is designated when the "duplex printing forcing" is set "execution" in the print permission condition. The control device 59 accepts only the instruction of the execution of copying where A4-size printing is designated when the "A4 printing forcing" is set "execution" in the print permission condition. The control device 59 accepts only the instruction of the execution of copying where aggregate print is designated when the "aggregate forcing" is set "execution" in the print permission condition.

The control device 59 accepts copying within a range of "remaining number of copying" in the print permission condition. The control device 59 accepts the instruction of the execution of color copying within a range of "remaining number of color copying" in the print permission condition.

Although the above has described the case where copying is executed in the client MFP 50, the similar operations also ensure that copying is executed in the manager MFP 40.

The user can register ID card information in the instruction accepting screen 90. Specifically, the user can register ID card information by setting an ID card in the ID card reader 57 and pressing the button 94 in the instruction accepting screen 90.

Figure 18:
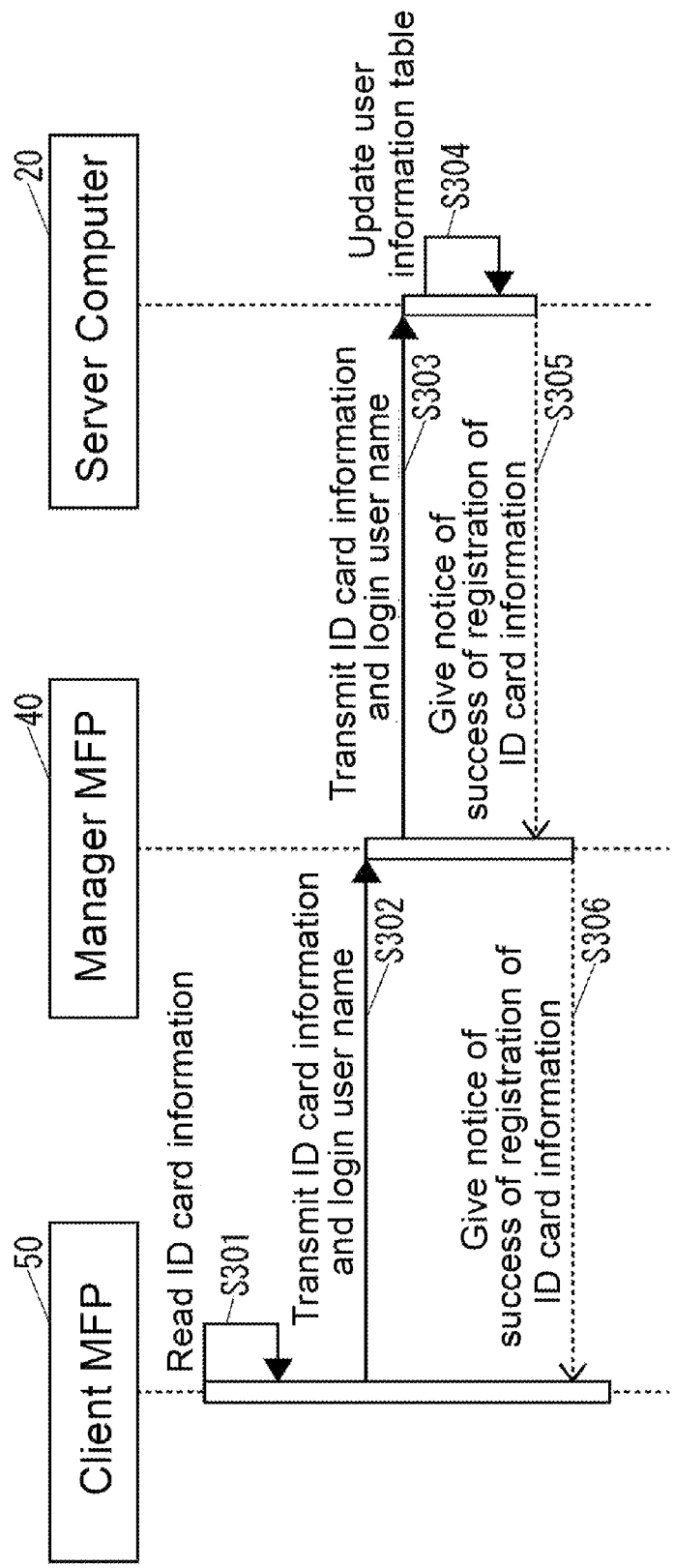
FIG. 18 illustrates the operations of the pull printing system according to the one embodiment when ID card information is registered.

FIG. 18 illustrates the operations of the pull printing system 10 when ID card information is registered.

As illustrated in FIG. 18, when the button 94 is pressed in the instruction accepting screen 90, the control device 59 of the client MFP 50 reads the ID card information from the ID card with the ID card reader 57 (Step S301).

Next, the control device 59 transmits the ID card information read in Step S301 to the manager MFP 40 together with the login user name of the logged-in user (Step S302).

When the manager MFP 40 received a combination of the ID card information and the login user name from the client MFP 50, the control device 49 of the manager MFP 40 transmits the received combination of the ID card information and the login user name to the server computer 20 (Step S303).

When the server computer 20 received the combination of the ID card information and the login user name from the manager MFP 40, the control device 25 of the server computer 20 updates the user information table 24a by the received ID card information (Step S304). Specifically, the control device 25 causes the storage device 24 to store the target ID card information as the ID card information associated with the target login user name in the user information table 24a. Here, when ID card information is already associated with the target login user name in the user information table 24a, the already associated ID card information is overwritten with the target ID card information.

Then, the control device 25 of the server computer 20 notifies the manager MFP 40 of the success of the registration of the ID card information (Step S305). When the control device 25 failed in the registration of the ID card information for some reason, the control device 25 may notify the manager MFP 40 of the failure of the registration of the ID card information.

When the success of the registration of the ID card information is notified from the server computer 20, the control device 49 of the manager MFP 40 notifies the client MFP 50 of the success of the registration of the ID card information (Step S306). When the failure of the registration of the ID card information is notified from the server computer 20, the control device 49 may notify the client MFP 50 of the failure of the registration of the ID card information.

When the success of the registration of the ID card information is notified from the manager MFP 40, the control device 59 of the client MFP 50 may display the success of the registration of the ID card information on the display device 52. Similarly, when the failure of the registration of the ID card information is notified from the manager MFP 40, the control device 59 may display the failure of the registration of the ID card information on the display device 52.

Although the above has described the case where the ID card information, which is read from the ID card with the ID card reader 57 of the client MFP 50, is registered, the similar operations also ensure that ID card information, which is read from an ID card with the ID card reader 47 of the manager MFP 40, is registered.

Next, a description will be given of the operations of the pull printing system 10 when the remaining amount of printing permitted to the user is updated.

Figure 19:
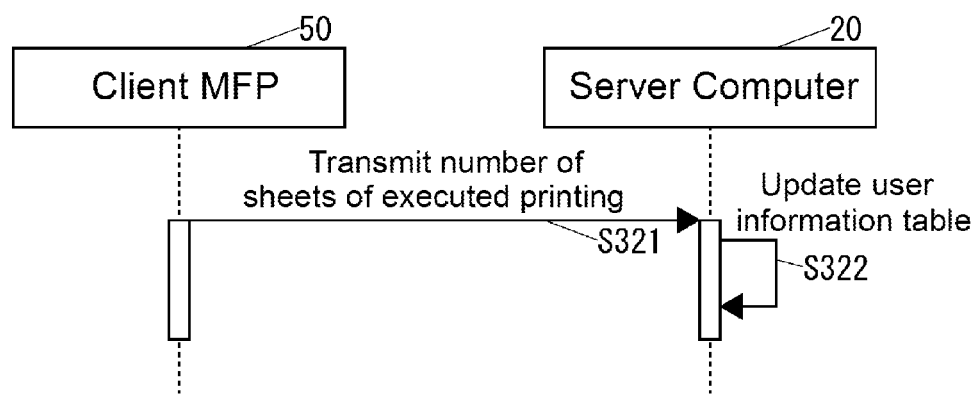
FIG. 19 illustrates the operations of the pull printing system according to the one embodiment when a remaining amount of printing permitted to a user is updated.
Figure 20:
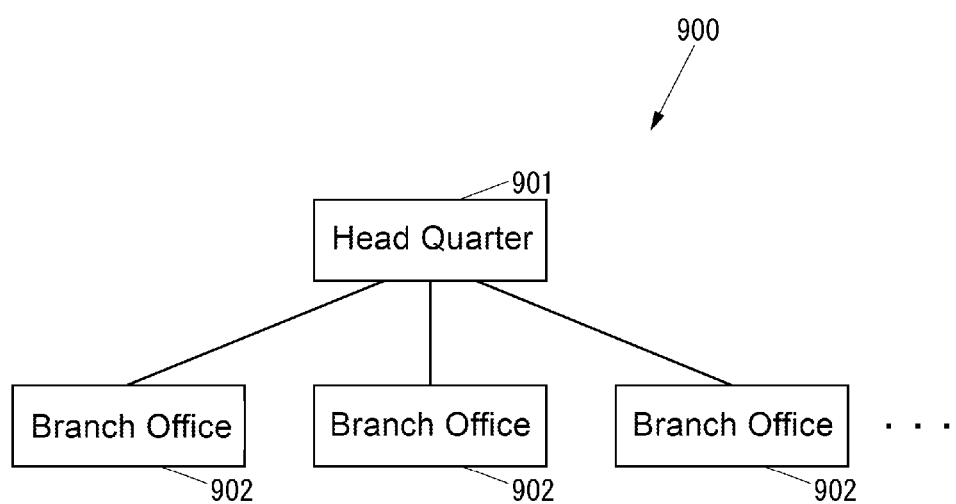
FIG. 20 illustrates a company where a conventional pull printing system is applied.

FIG. 19 illustrates the operations of the pull printing system 10 when the remaining amount of printing permitted to the user is updated.

As illustrated in FIG. 19, when ordinary printing is executed in the client MFP 50, or pull printing is executed in the client MFP 50, the print amount transmitting unit 59e of the client MFP 50 is a unit that transmits the number of sheets of printing executed in the ordinary printing or pull printing to the server computer 20, together with the type of "color printing" and "monochrome printing," and the login user name of the logged-in user (Step S321).

When the number of sheets of printing executed in the client MFP 50 is transmitted from the client MFP 50, the control device 25 of the server computer 20 updates the user information table 24a (Step S322). Specifically, when the number of sheets of the execution of the "monochrome printing" is transmitted from the client MFP 50, the control device 25 executes a process which reduces the number of sheets transmitted from the client MFP 50, with respect to the "remaining number of printing" associated with the target login user name in the user information table 24a.

When the number of sheets of the execution of the "color printing" is transmitted from the client MFP 50, the control device 25 executes a process which reduces the number of sheets transmitted from the client MFP 50, with respect to each of the "remaining number of printing" and the "remaining number of color printing" associated with the target login user name in the user information table 24a.

Although the above has described the case where the ordinary printing or pull printing was executed in the client MFP 50, the same applies also to the case where copying was executed in the client MFP 50. Namely, when the number of sheets of the execution of "monochrome copying" is transmitted from the client MFP 50, the control device 25 of the server computer 20 executes a process which reduces the number of sheets transmitted from the client MFP 50, with respect to the "remaining number of copying" associated with the target login user name in the user information table 24a. When the number of sheets of the execution of the "color copying" is transmitted from the client MFP 50, the control device 25 executes a process which reduces the number of sheets transmitted from the client MFP 50, with respect to each of the "remaining number of copying" and the "remaining number of color copying" associated with the target login user name in the user information table 24a.

Although the above has described the case where the remaining amount of printing is updated based on the number of sheets of the execution of the printing in the client MFP 50, the similar operations also ensure that the remaining amount of printing is updated based on the number of sheets of the execution of the printing, in the manager MFP 40.

As described above, in the pull printing system 10, the server computer 20 does not need to manage the print job because the manager MFP 40 manages the print job. Accordingly, the pull printing system 10 can reduce communication traffic amount to the server computer 20 in comparison with a configuration where the server computer 20 manages the print job.

Although the pull printing system 10 is configured that the print job is managed in each of a plurality of LANs 12, it is sufficient that the manager MFP 40, which can not only manage the print job but also execute the print job, is arranged in each of the plurality of LANs 12, and thus a dedicated device only for management of the print job does not need to be arranged in each of the plurality of LANs 12. Accordingly, the pull printing system 10 ensures reduction of management burden on devices.

The pull printing system 10 ensures reduction of processing burden of the manager MFP 40, which manages the print job, because the server computer 20 manages the print permission condition of the users.

In the pull printing system 10, the amount of printing executed by the client MFP 50 is transmitted to the server computer 20 without via the manager MFP 40 (Step S321), and thus, this ensures the reduction of the communication traffic amount between the client MFP 50 and manager MFP 40, and the communication traffic amount between the manager MFP 40 and the server computer 20. Accordingly, the pull printing system 10 ensures the reduction of the processing burden of the manager MFP 40 managing the print job.

Although a "manager image forming apparatus" of the disclosure is the manager MFP 40 in the embodiment, and it may be a device other than an MFP such as a printer-only machine as long as the device executes a print job.

Similarly, although a "client image forming apparatus" of the disclosure is the client MFP 50 in the embodiment, and it may be a device other than an MFP such as a printer-only machine as long as the device executes a print job.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A pull printing system comprising:
a server computer connected with a plurality of local area networks (LANs) via a wide area network;
a computer connected to each of the plurality of LANs;
a manager image forming apparatus connected to each of the plurality of LANs; and
a client image forming apparatus connected to each of the plurality of LANs; wherein
the server computer executes authentication of a user based on authentication information of the user;
the computer transmits a print job to the manager image forming apparatus;
the manager image forming apparatus manages the print job transmitted from the computer;
the client image forming apparatus performs the print job managed by the manager image forming apparatus;
the manager image forming apparatus performs the print job received to a first port number, and manages the print job received to a second port number different from the first port number in association with the user;
the computer sets the second port number input by the user and used when communicating with the manager image forming apparatus via a Raw protocol;
the client image forming apparatus accepts the authentication information input by the user, and transmits the authentication information input by the user to the manager image forming apparatus;
the manager image forming apparatus transmits the authentication information from the client image forming apparatus to the server computer, and transmits the print job to the client image forming apparatus, the print job being associated with the user authenticated by the server computer based on the authentication information transmitted to the server computer from the manager image forming apparatus, among the print jobs managed by the manager image forming apparatus;
the computer assigns commands for printer job language of the print job transmitted to the second port number in the manager image forming apparatus;
the commands include a first command that indicates a login user name, a second command that indicates a login password, a third command that indicates a job name, and a fourth command that sets at least one of a duplex printing setting, the number of pages, and a color mode; and
the manager image forming apparatus extracts information of the login user name and the login password from the commands, transmits the information of the login user name and the login password to the computer server, and manages the print job transmitted to the second port number when the information of the login user name and the login password are authenticated by the server computer.

2. The pull printing system according to claim 1, wherein:
the server computer manages a print permission condition permitted to each of users on printing;
the manager image forming apparatus receives the print permission condition managed by the server computer, with respect to the user authenticated by the server computer, and transmits the print permission condition from the server computer to the client image forming apparatus; and
the client image forming apparatus executes the print job corresponding to the print permission condition transmitted from the manager image forming apparatus.

3. The pull printing system according to claim 2, wherein:
the server computer manages a remaining amount of printing permitted to each of the users, as one of the print permission conditions; and
the client image forming apparatus transmits an amount of printing performed by the client image forming apparatus to the server computer without the transmission being via the manager image forming apparatus.

* * * * *